(12) United States Patent
Yamasaki (10) Patent No.: US 8,710,391 B2
(45) Date of Patent: Apr. 29, 2014

(54) PRE-SEALING UNIT FOR WIRE-CUT ELECTRIC DISCHARGE MACHINE

(75) Inventor: Mizuho Yamasaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 32 days.

(21) Appl. No.: 13/524,104

(22) Filed: Jun. 15, 2012

(65) Prior Publication Data

US 2013/0056445 A1 Mar. 7, 2013

(30) Foreign Application Priority Data

Sep. 6, 2011 (JP) .................................. 2011-194138

(51) Int. Cl.
*B23H 7/02* (2006.01)

(52) U.S. Cl.
USPC ..................... 219/69.12; 219/69.14

(58) Field of Classification Search
USPC ......... 219/69.11, 69.12, 69.14; 277/602, 609, 277/616, 630, 637
See application file for complete search history.

(56) References Cited

U.S. PATENT DOCUMENTS

| | | | | |
|---|---|---|---|---|
| 4,992,640 A | * | 2/1991 | Tanaka et al. | 219/69.12 |
| 5,028,757 A | * | 7/1991 | Aramaki et al. | 219/69.12 |
| 5,111,016 A | * | 5/1992 | Lodetti et al. | 219/69.12 |
| 5,196,666 A | * | 3/1993 | Hosaka | 219/69.12 |
| 5,374,795 A | * | 12/1994 | Enami | 219/69.12 |
| 6,831,245 B1 | * | 12/2004 | Koba et al. | 219/69.12 |
| 2006/0237915 A1 | * | 10/2006 | Kita et al. | 219/69.12 |

FOREIGN PATENT DOCUMENTS

| | | |
|---|---|---|
| EP | 0667202 A1 | 8/1995 |
| JP | 1257522 A | 10/1989 |
| JP | 4159023 A | 6/1992 |
| JP | 7060550 A | 3/1995 |
| JP | 10-296543 A * | 11/1998 |
| JP | 11129120 A | 5/1999 |
| JP | 2006130597 A | 5/2006 |
| JP | 2006297570 A | 11/2006 |

* cited by examiner

*Primary Examiner* — Geoffrey S Evans
(74) *Attorney, Agent, or Firm* — Lowe Hauptman & Ham, LLP (57) ABSTRACT

A sealing mechanism is disposed in a lower-arm insertion portion of a working tank of a wire-cut electric discharge machine, and a pre-sealing unit is attached to the sealing mechanism. The pre-sealing unit includes bellows unit and partition unit which surrounds the sealing mechanism from within the working tank. Further, a supply pipe formed with a plurality of openings directed to the sealing mechanism is located at the upper part of the bellows unit, and a working fluid is introduced into the pre-sealing unit through the openings of the supply pipe.

3 Claims, 9 Drawing Sheets

PRE-SEALING UNIT FOR WIRE-CUT ELECTRIC DISCHARGE MACHINE

RELATED APPLICATIONS

The present application is based on, and claims priority from, Japanese Application No. 2011-194138, filed Sep. 6, 2011, the disclosure of which is hereby incorporated by reference herein in its entirety.

BACKGROUND OF THE INVENTION

1. Field of the Invention

The present invention relates to a pre-sealing unit for a working-fluid tank (hereinafter referred to as the "working tank") of a wire-cut electric discharge machine configured so that a workpiece is immersed in a working fluid during electric discharge machining, and more specifically, to a pre-sealing unit attached to a working-tank sealing mechanism for sealing between the working tank and a lower arm moving relative to the working tank.

2. Description of the Related Art

A pre-sealing unit for a wire-cut electric discharge machine is provided with means for preventing a large amount of contaminants, such as sludge, produced during machining from penetrating into or adhering to various parts of a sealing mechanism. Japanese Patent Application Laid-Open No. 7-60550 discloses an example of the pre-sealing unit, which is attached to a sealing mechanism in a lower-arm insertion portion of a working tank mounted on a movable table. This pre-sealing unit comprises a partition member, which surrounds the sealing mechanism from within the working tank, and means for feeding a clean working fluid into a space, which is defined by the sealing mechanism and the partition member, under a pressure higher than the pressure of the working fluid present outside the space. Further, a window portion is formed at that part of the partition member which faces the inside of the working tank, and a bellows and a movable-window closing member are arranged at the window portion. The bellows has an operating range corresponding to the range of movement of the movable table in the direction perpendicular to the axis of a lower arm which is inserted in the movable-window closing member. The greater part of the window portion of the partition member is closed by the closing member and the bellows.

According to the technique disclosed in Japanese Patent Application Laid-Open No. 7-60550 described above, the clean working fluid is supplied to the pre-sealing unit (that is, a space defined by the partition member, bellows, movable-window closing member, and sealing mechanism) attached to the working tank through a fluid supply pipe. Even in case where any part of the sealing mechanism is contaminated from any cause, contaminants can be discharged by introducing the clean working fluid into the pre-sealing unit under a pressure higher than the pressure of the working fluid in any other space in the working tank. In the supply of the clean working fluid through the fluid supply pipe, however, it is difficult to equally distribute the working fluid into the pre-sealing unit.

Thereupon, in order to solve this problem, a technique has been proposed such that a clean working fluid introduced through a fluid supply pipe is discharged into a pre-sealing unit through openings in a pre-sealing bellows cover attached to the pre-sealing unit. The following is a description of this technique.

Figure 1:
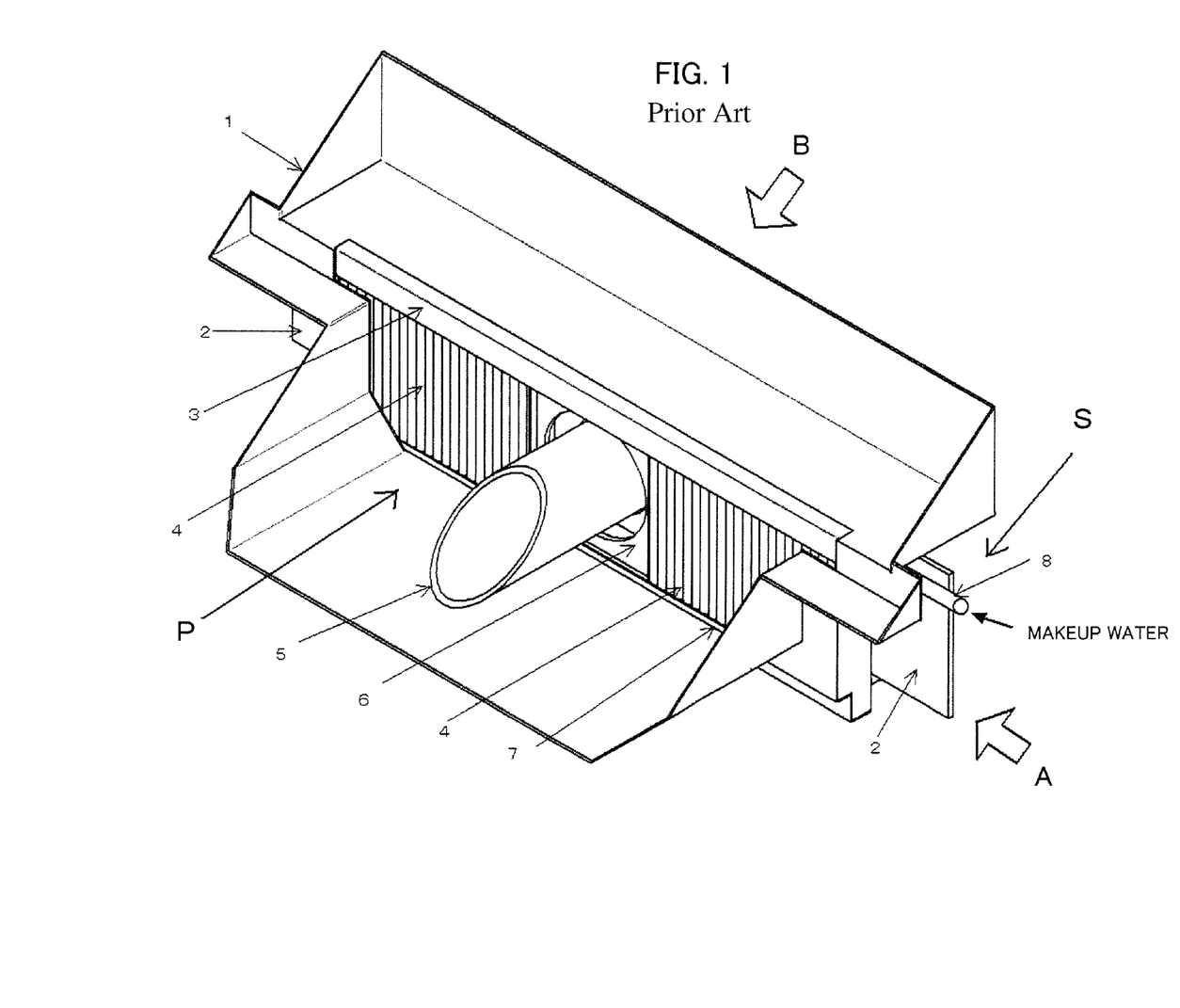
FIG. 1 is a cutaway perspective view of a prior art working-tank sealing mechanism configured so that a clean working fluid introduced through a fluid supply pipe can be supplied to a pre-sealing unit through a pre-sealing bellows cover.

Referring now to FIG. 1 (cutaway perspective view) and FIG. 2 (side sectional view), there will be described a sealing mechanism S of a working tank 1 configured so that a clean working fluid introduced through a fluid supply pipe 8 is introduced into a pre-sealing unit P through a pre-sealing bellows cover 3.

The wall of the working tank 1 is formed with a window portion, which constitutes a lower-arm insertion portion. A seal base 11 is secured to the outer surface of the wall of the working tank 1. The seal base 11 is formed with an opening of the same shape and size as the window portion of the working tank 1 such that it overlaps the window portion. A seal plate 2 is supported by a bearing 12 on the seal base 11 such that it is transversely slidable (perpendicular to the drawing plane of FIG. 2). The bearing 12 on the seal base 11 comprises roller bearings 12a for regulating the vertical movement of the seal plate 2 and roller bearings 12b for regulating the longitudinal movement of the seal plate 2, thereby resisting the water pressure in the working tank 1. Several roller bearings are arranged at suitable intervals along each of the upper and lower edge portions of the seal base 11. The respective rolling surfaces of the bearings serve to guide the upper and lower edge portions of the seal plate 2.

A flange-like seal member 13 having an oil-seal structure therein is secured to the elevational central part of the seal plate 2. An arm cover 5, which is movable integrally with a lower arm, extends outwardly relative to the working tank 1 passing through the seal plate 2 and the seal member 13 thereon and is secured to a column (not shown) of the main body of the wire-cut electric discharge machine. The seal plate 2 closely contacts the outer surface of the seal base 11, thereby closing the opening in the seal base, as it moves relative to the working tank 1 and the seal base 11. Accordingly, there is no possibility of a large amount of working fluid flowing out through the opening of the seal base 11. Further, leakage of the working fluid through a gap between the arm cover 5 and respective through-holes of the seal plate 2 and the seal member 13, through which the arm cover 5 is passed, is minimized by the agency of the oil-seal structure in the seal member 13.

Alternatively, an arm bellows may be attached to the outside of the arm cover 5 such that the distal end of the arm cover 5 closely contacts the arm bellows and that the seal member 13 and the arm bellows closely contact each other. By doing this, leakage of the working fluid to the gap between the arm cover 5 and the respective through-holes of the seal plate 2 and the seal member 13 can be suppressed in the same manner as aforesaid.

The above is a description of an outline of the sealing mechanism S.

The pre-sealing unit P is attached to the sealing mechanism S on the wall of the working tank 1 of the wire-cut electric discharge machine. The pre-sealing unit P comprises partition means that surrounds the sealing mechanism S from within the working tank 1. This partition means comprises the seal plate 2, the seal member 13, a supporting member 10, a center plate 6, the pre-sealing bellows cover 3, a pre-sealing bellows rail 7, and the peripheral surface of the opening in the working tank 1.

The center plate 6 that constitutes the partition means is secured by screws or the like to the supporting member 10 attached to the seal member 13. The center plate 6 is formed with a through-hole through which the arm cover 5 is passed. Further, the opposite sides, left and right, of the center plate 6 are connected to pre-sealing bellows 4, individually. The respective upper sides of the center plate 6 and the pre-sealing bellows 4 are guided by the pre-sealing bellows cover 3, and the lower sides of the center plate 6 and the pre-sealing bellows 4 are guided by the pre-sealing bellows rail 7. The longitudinal direction of the pre-sealing bellows cover 3 is perpendicular to the axis of the lower arm (or the axis of the arm cover 5). As the arm cover 5 moves left and right, the seal plate 2 also moves left and right. The center plate 6 also moves left and right in conjunction with the seal plate 2. Baffle plates 3a attached to the pre-sealing bellows cover 3 will be described with reference to FIG. 4 later.

Figure 2:
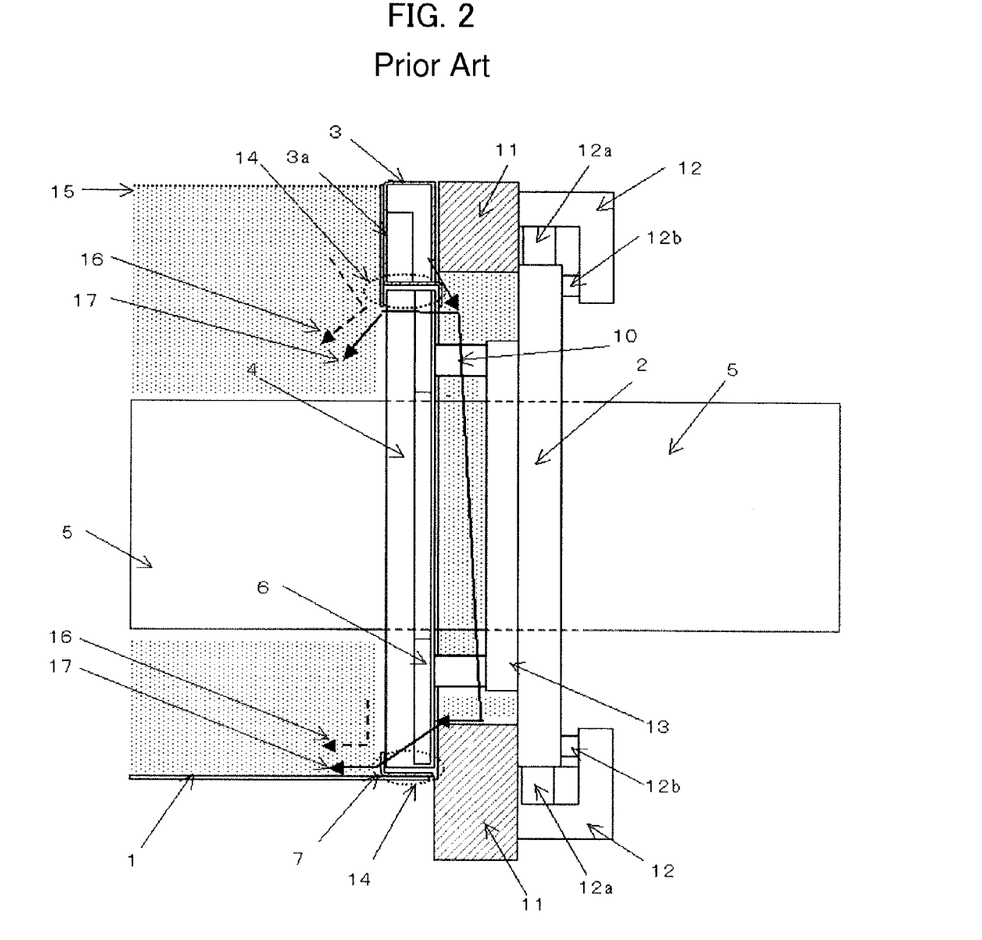
FIG. 2 is a sectional view of the working-tank sealing mechanism of FIG. 1 in a filled-up state, taken in the direction of arrow A.

FIG. 2 shows the working-tank sealing mechanism of FIG. 1 in a filled-up state. In FIG. 2, reference numeral 15 denotes the level of the working fluid.

Penetration of contaminants can be prevented, as indicated by arrow 16, as the clean working fluid flows out through small gaps 14 between the pre-sealing bellows rail 7 and the upper part of each pre-sealing bellows 4 and between the pre-sealing bellows cover 3 and the lower part of each bellows 4, as indicated by arrow 17.

Figure 3:
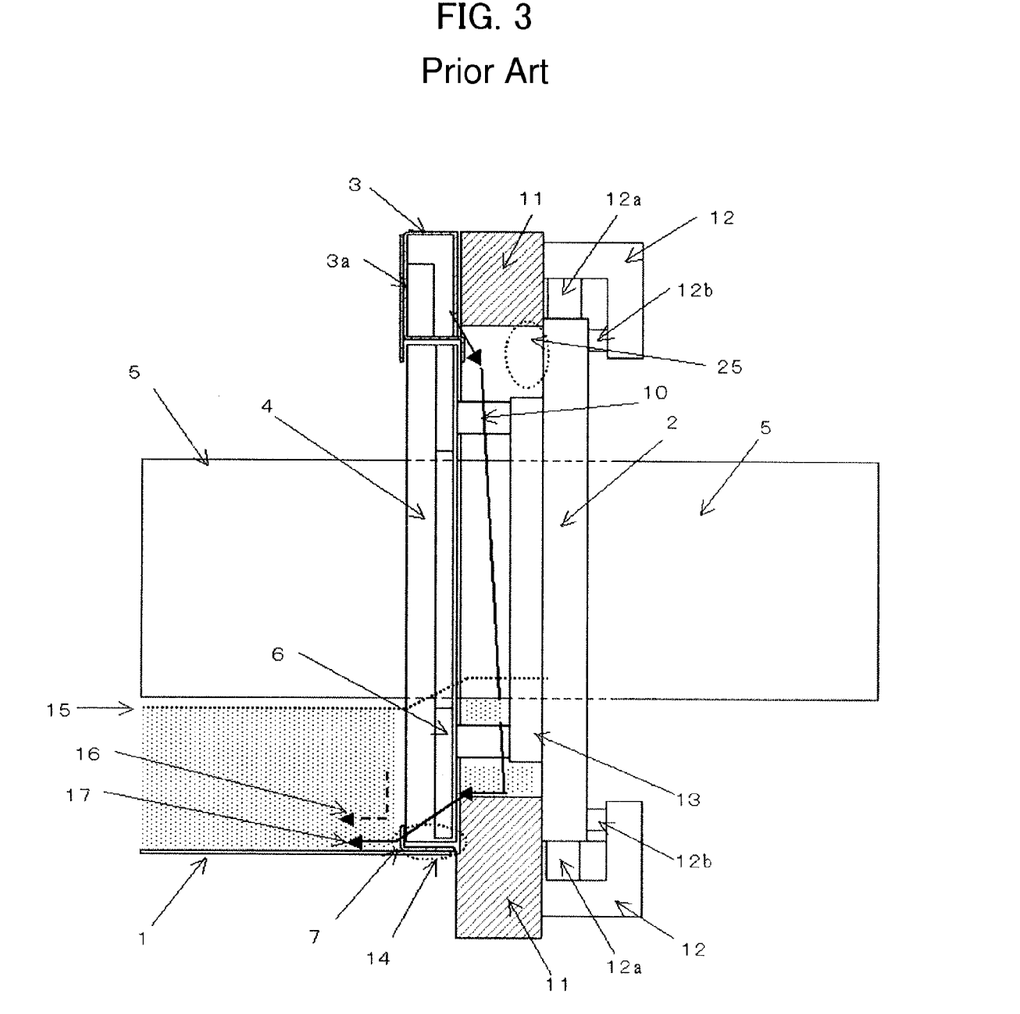
FIG. 3 is a sectional view of the working-tank sealing mechanism of FIG. 1 in a completely drained state, taken in the direction of arrow A.

FIG. 3 shows the working-tank sealing mechanism of FIG. 1 in a completely drained state. In FIG. 3, reference numeral 15 denotes the level of the working fluid.

Figure 4:
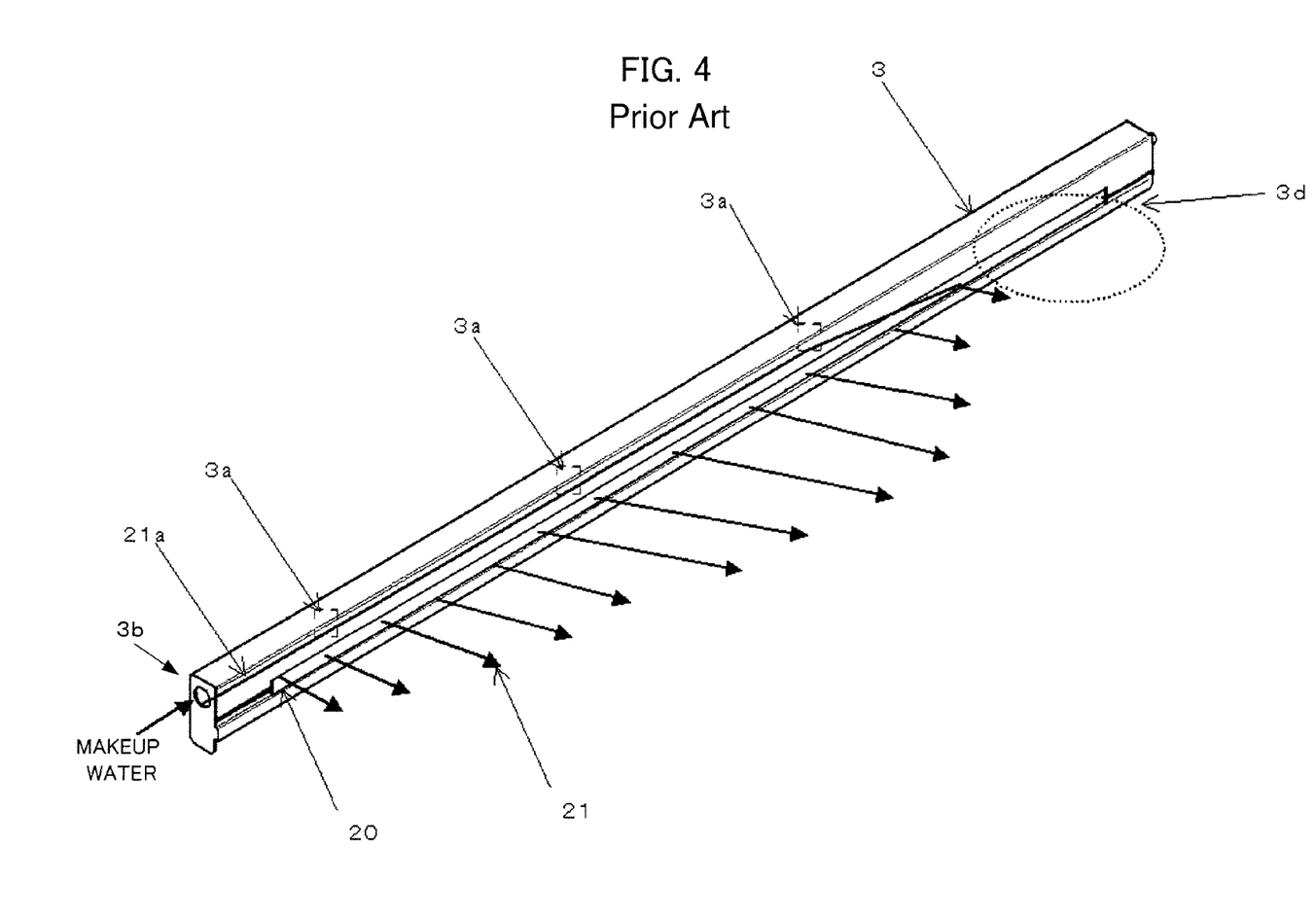
FIG. 4 is a perspective view of an example of the pre-sealing bellows cover used in the working-tank sealing mechanism of FIG. 1, having a working-fluid supply port (makeup water supply port) only on one side of the bellows cover.

If the working fluid level 15 in the working tank 1 is lower than the height level of the pre-sealing unit P, as in the completely drained state shown in FIG. 3, the water level in the pre-sealing unit P is also inevitably low. Thus, the working tank 1 cannot be kept filled with the clean working fluid. Depending on the state of the clean working fluid supplied from the pre-sealing bellows 4, as shown in FIG. 4, a region 25 free of the clean working fluid is created, as shown in FIG. 3, so that adhesion of contaminants may be caused. In FIG. 3, reference numerals 16 and 17 denote flows of the contaminants in the working tank and the clean working fluid discharged from the pre-sealing bellows cover, respectively. Reference numeral 25 denotes that region of the sealing mechanism to which the working fluid is not supplied.

FIG. 4 is a perspective view of the pre-sealing bellows cover 3.

The clean working fluid (makeup water) is introduced into the space inside the pre-sealing bellows cover 3 through the fluid supply pipe 8 (FIG. 1). The pre-sealing bellows cover 3 is formed with openings 20 through which the clean working fluid is introduced into the pre-sealing unit P. Further, the baffle plates 3a for regulating the flow of the working fluid in the internal space are attached individually to a plurality of longitudinal portions of the pre-sealing bellows cover 3.

The clean working fluid introduced into the pre-sealing bellows cover 3 through its supply port side 3b flows in the direction of arrow 21a and hits the baffle plates 3a, whereupon it is supplied as water currents indicated by arrows 21 to the working tank 1 through the openings 20 in the bellows cover. In FIG. 1, the length of each arrow that represents the water current from each corresponding opening 20 indicates the strength of the water current.

Depending on the amount of the working fluid (makeup water) introduced to the inside through the supply port side 3b, the clean working fluid may fail to be discharged from those openings 20 of the pre-sealing bellows cover which are located far from the supply port side 3b, as indicated by reference numeral 3d. In FIG. 4, reference numeral 3d denotes a region that covers those openings 20 which cannot be reached by the working fluid.

Figure 5:
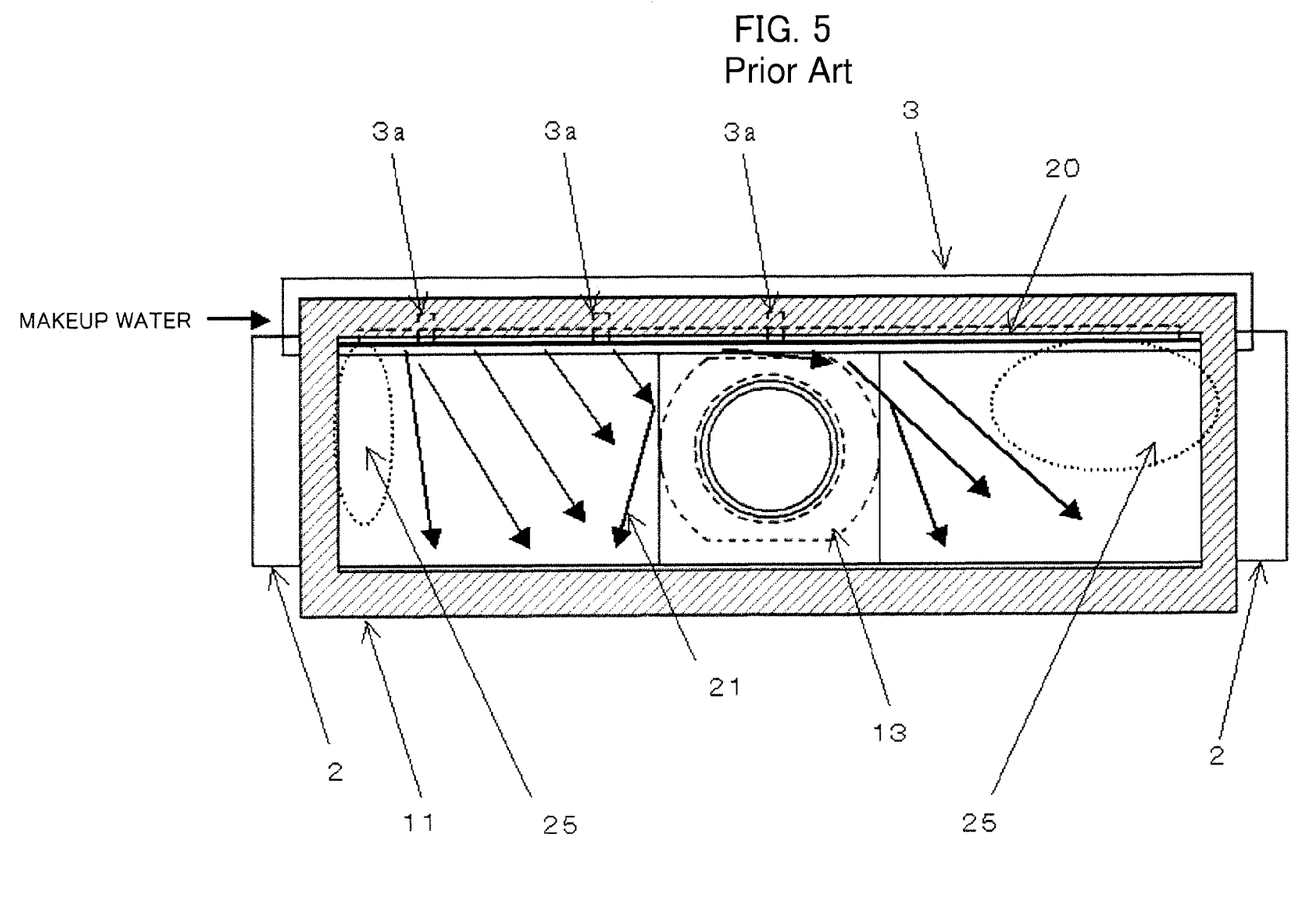
FIG. 5 is a rear sectional view of the working-tank sealing mechanism of FIG. 1, illustrating the direction of water current from an opening of the pre-sealing bellows cover.

Viewing the pre-sealing unit P from the back reveals that the water currents 21 from the openings of the pre-sealing bellows cover are not uniformly introduced into the pre-sealing unit P as a whole, as shown in FIG. 5.

Figure 6:
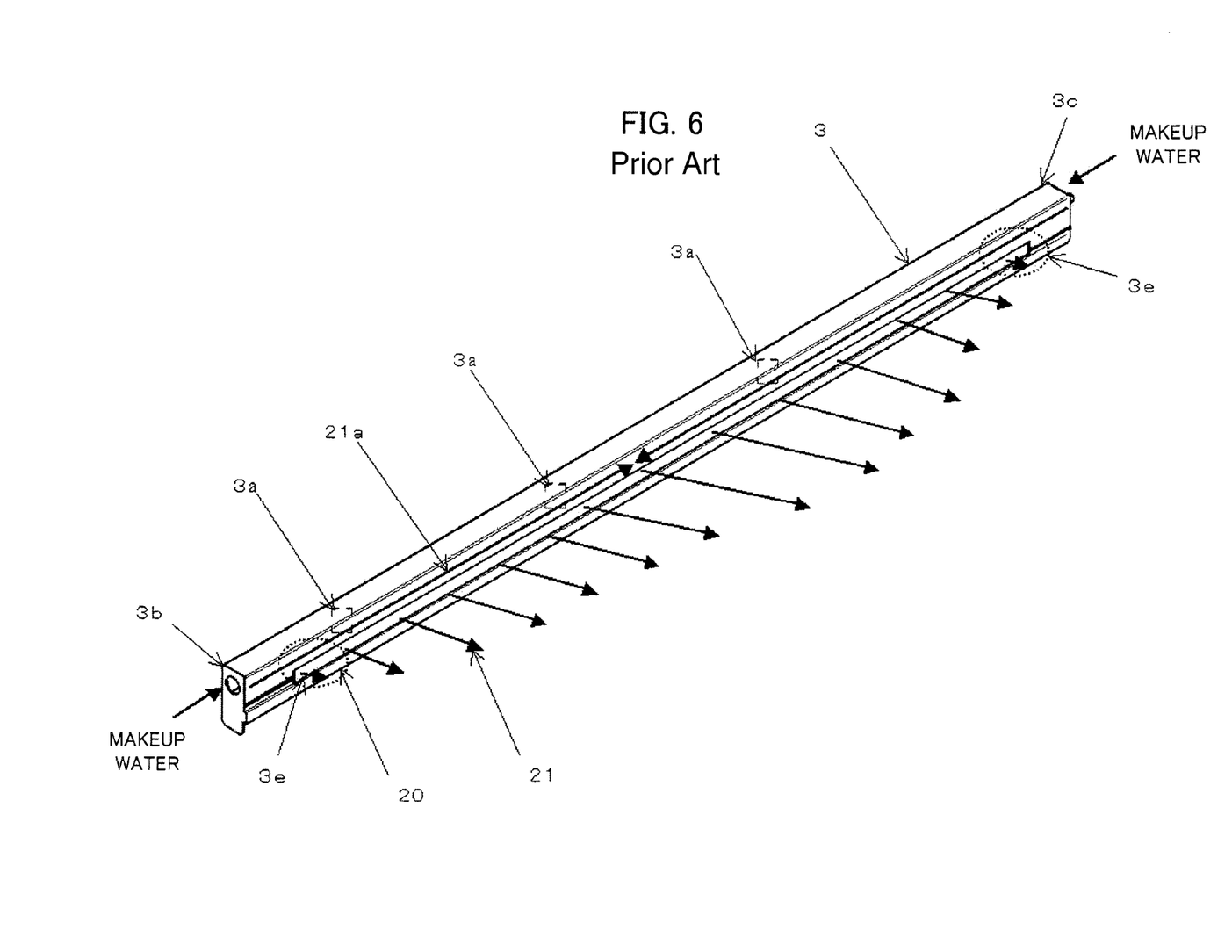
FIG. 6 is a perspective view of another example of the pre-sealing bellows cover used in the working-tank sealing mechanism of FIG. 1, having working-fluid supply ports (makeup water supply ports) on two opposite sides of the bellows cover.

Thereupon, in order to avoid the problems described with reference to FIGS. 2 to 5, a proposal has been made to provide a working-fluid supply port (makeup water supply port) on the other supply port side 3c of the pre-sealing bellows cover 3, as well as on the one supply port side 3b opposite thereto, as shown in FIG. 6. By doing this, the water currents 21 from the openings 20 of the pre-sealing bellows cover 3 can be made bilaterally symmetrical with respect to the longitudinal direction of the pre-sealing bellows cover 3. With this configuration of the pre-sealing bellows cover 3, however, the water currents 21 from those openings 20 (in regions 3e in FIG. 6) which are located near the supply port sides 3b and 3c of the pre-sealing bellows cover 3 may be reduced in some cases. If the feed of the working fluid (makeup water) from the pre-sealing bellows cover 3 into the pre-sealing unit P is increased as a whole, in order to avoid the reduction of the water currents 21 from the openings 20 near the supply port sides 3b and 3c, however, the life of a filter filtering out contaminant, which may be used in the wire-cut electric discharge machine, is inevitably reduced.

SUMMARY OF THE INVENTION

Accordingly, the object of the present invention is to provide a pre-sealing unit for a wire-cut electric discharge machine, capable of efficiently discharging contaminants at low cost by modifying a method for introducing a clean working fluid to the pre-sealing unit.

A pre-sealing unit for a wire-cut electric discharge machine according to the present invention is attached to a sealing mechanism in a lower-arm insertion portion of a working tank mounted on a movable table. The pre-sealing unit comprises partition unit which surrounds the sealing mechanism from within the working tank, working-fluid supply unit which introduces a clean working fluid into a space defined by the sealing mechanism and the partition unit, under a pressure higher than the pressure of the working fluid present outside the space, bellows unit having an operating range corresponding to the range of movement of the movable table in the direction perpendicular to the axis of a lower arm, and a movable-window closing member through which the lower arm is inserted. In addition, a window portion is formed on the partition unit at a portion facing the inside of the working tank, and the bellows unit and the movable-window closing member are arranged at the window portion so that the greater part of the window portion is closed thereby. Further, a supply pipe, the longitudinal direction of which is perpendicular to the axis of the lower arm and which has a plurality of openings on the sealing mechanism side thereof, is located at the upper part of the bellows unit, whereby the clean working fluid is allowed to be introduced into the pre-sealing unit through the openings of the supply pipe.

The sum total of the respective cross-sectional areas of the openings of the supply pipe may be smaller than the cross-sectional area of a supply port leading to the supply pipe.

The bellows unit may be supported by a cover to which the supply pipe is attached.

According to the present invention, there can be provided a pre-sealing unit for a wire-cut electric discharge machine, capable of efficiently discharging contaminants at low cost by modifying a method for introducing a clean working fluid to the pre-sealing unit.

BRIEF DESCRIPTION OF THE DRAWINGS

The above and other objects and features of the present invention will be apparent from the ensuing description of embodiments with reference to the accompanying drawings, in which.

DETAILED DESCRIPTION OF THE PREFERRED EMBODIMENTS

Embodiments of the present invention will now be described with reference to the accompanying drawings. In these drawings, like reference numeral refer to structural elements identical with or similar to those of the prior art described with reference to FIGS. 1 to 6.

A pre-sealing bellows cover used in one embodiment of a pre-sealing unit according to the present invention will be described with reference to FIG. 7.

Figure 7:
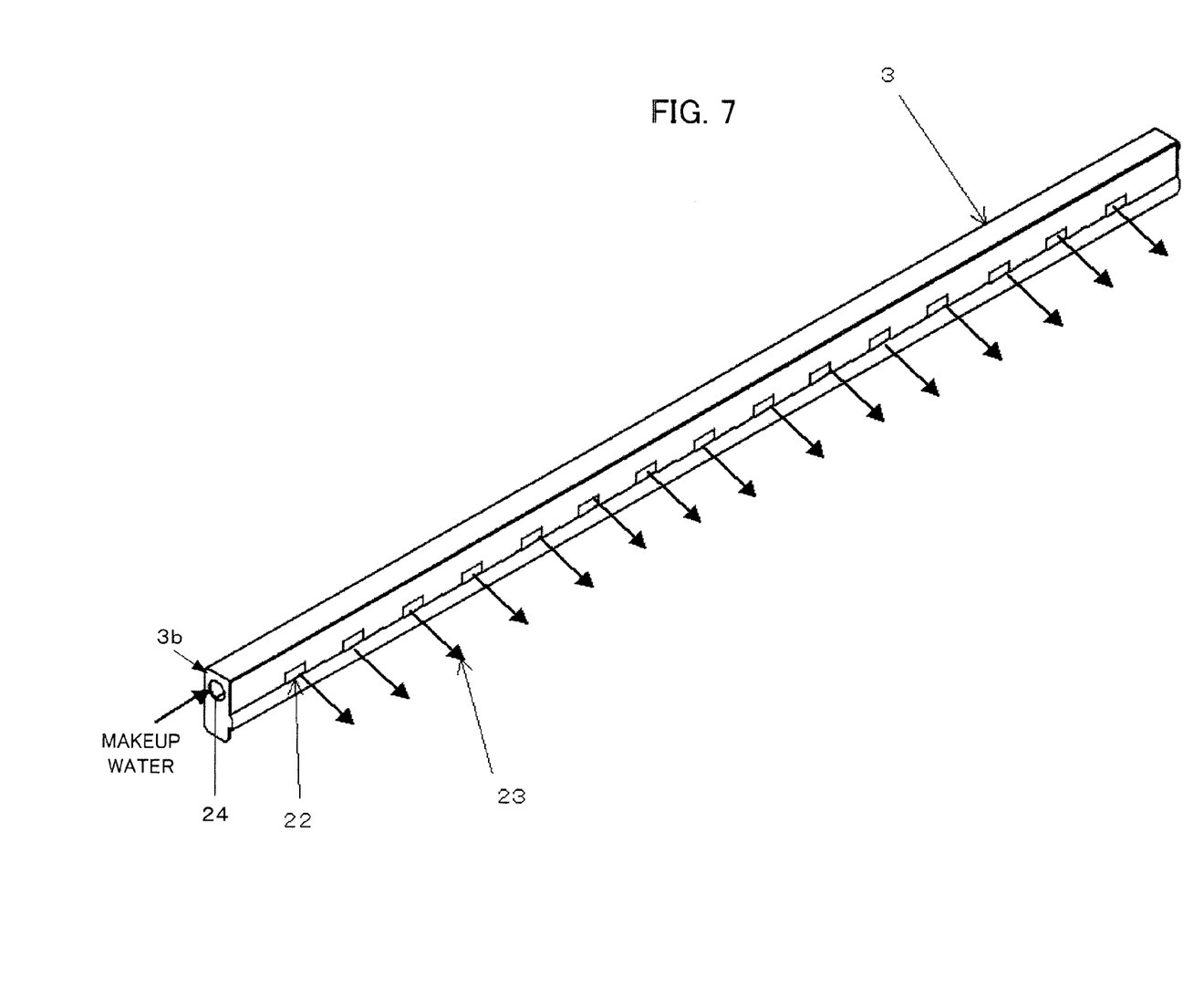
FIG. 7 is a perspective view of a pre-sealing bellows cover used in one embodiment of a pre-sealing unit according to the present invention.

In place of the pre-sealing bellows cover 3 used in the conventional pre-sealing unit P described with reference to FIGS. 1 to 6, a pre-sealing bellows cover 3 with the structure shown in FIG. 7 is used in the pre-sealing unit according to the present invention. More specifically, the pre-sealing unit according to the present invention differs from the prior art pre-sealing unit described with reference to FIGS. 1 to 6 only in the structure of the pre-sealing bellows cover for use as a supply pipe through which a clean working fluid is introduced into the pre-sealing unit attached to a working tank. As regards other structures, these two pre-sealing units resemble each other.

As shown in FIG. 7, the pre-sealing bellows cover 3 is formed with a plurality of openings 22 arranged longitudinally relative to the cover 3. The openings 22 of the pre-sealing bellows cover 3 are designed so that the sum total of their respective cross-sectional areas is smaller than the cross-sectional area of a working-fluid supply port side 3b of the pre-sealing bellows cover 3. By doing this, the internal space of the pre-sealing bellows cover 3 can be filled up with the working fluid (makeup water) introduced through a working-fluid compensating port 24 without regard to the flow rate of the working fluid. The compensating port 24 is supplied with the working fluid by a working-fluid supply pump (not shown) under a pressure higher than the pressure of the working fluid present within a working tank 1, that is, present outside partition means that surrounds a sealing mechanism S from within the working tank 1.

Thus, water currents are not biased within the pre-sealing bellows cover 3, and a water current 23 that is discharged into the working tank 1 through the openings 22 of the pre-sealing bellows cover 3 can be adjusted so that its strength is uniform in the longitudinal direction of the pre-sealing bellows cover 3, as shown in FIG. 7. Each of the openings 22 in the pre-sealing bellows cover 3 is not limited to the rectangular shape shown in FIG. 7, and may be square, circular, or elliptical. Alternatively, a pipe having a plurality of openings may be arranged side by side with the pre-sealing bellows cover 3 so that the clean working fluid (makeup water) can be introduced toward the pre-sealing bellows cover 3 through the openings of the pipe.

Figure 8:
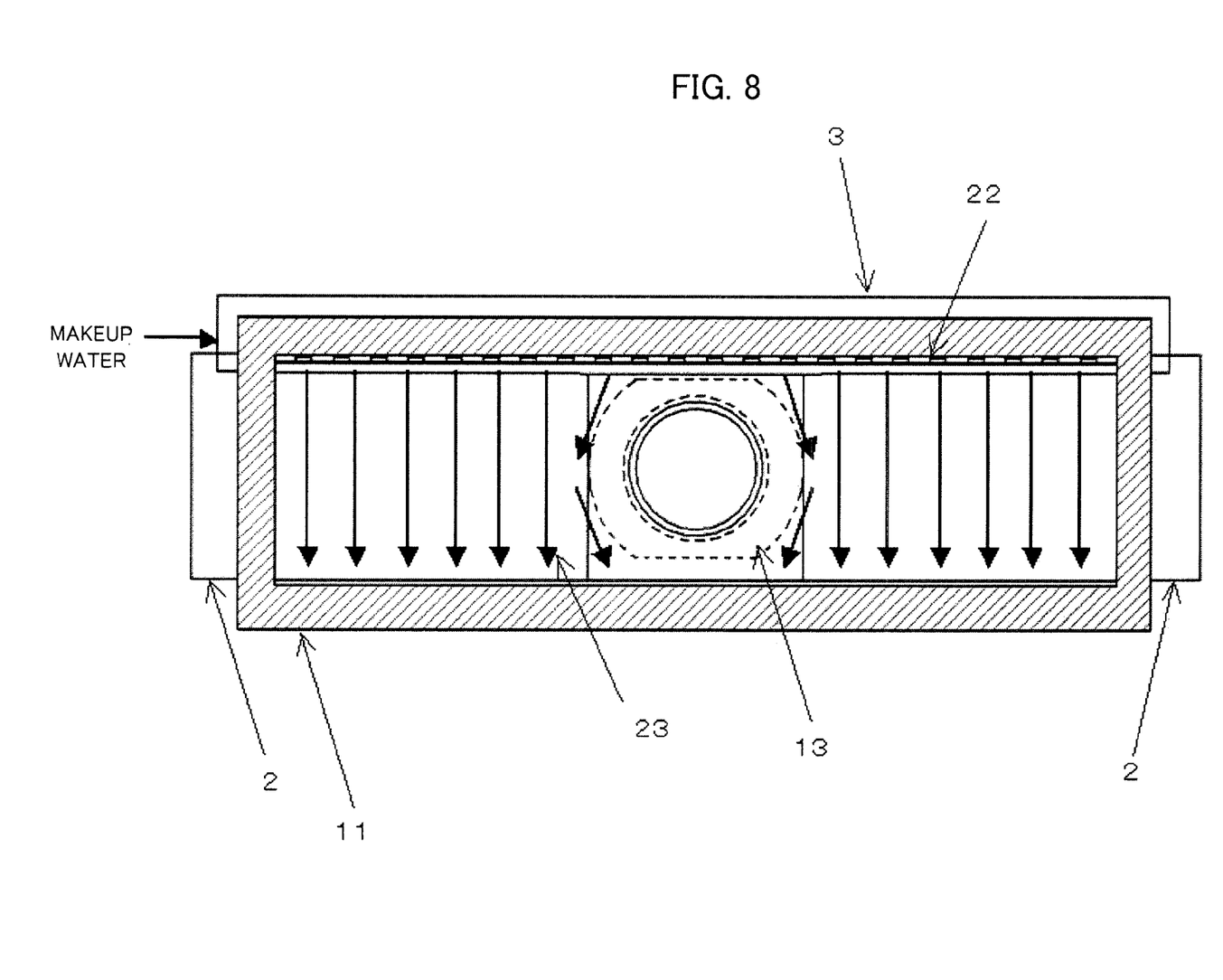
FIG. 8 is a sectional view of the working-tank sealing mechanism of FIG. 1 with the pre-sealing bellows cover of FIG. 7 used in the pre-sealing unit, taken in the direction of arrow B of FIG. 1.
Figure 9:
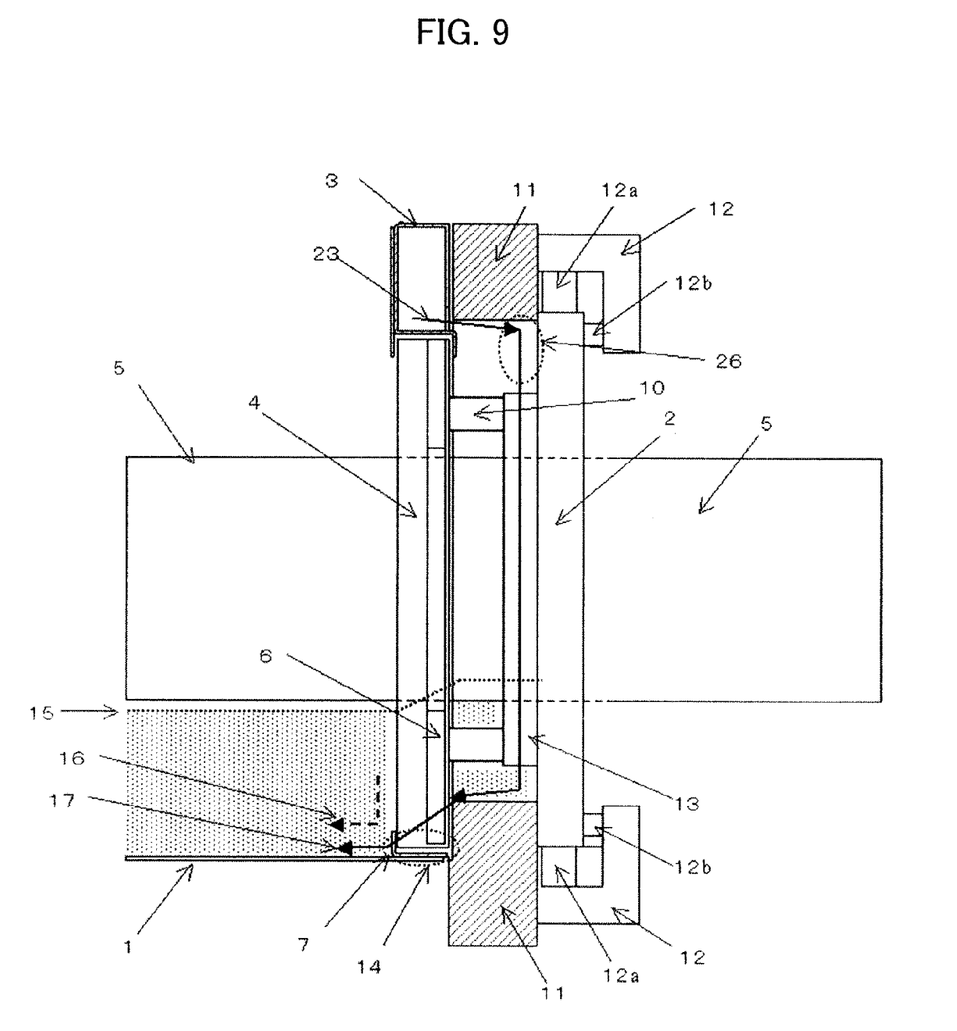
FIG. 9 is a sectional view of the working-tank sealing mechanism of FIG. 1 in the completely drained state, taken in the direction of arrow A of FIG. 1.

FIGS. 8 and 9 are sectional views of the working-tank sealing mechanism of FIG. 1 with the pre-sealing bellows cover of FIG. 7 used in the pre-sealing unit, taken in the directions of arrows B and A, respectively, of FIG. 1. The sealing mechanism shown in FIG. 9 is completely drained.

As shown in FIG. 8, the working fluid (makeup water) is uniformly discharged into the pre-sealing unit P through the openings 22 of the pre-sealing bellows cover 3. Thus, the working fluid can be equally distributed to the upper part of the sealing mechanism in the pre-sealing unit P.

If a working fluid level 15 in the working tank 1 becomes lower than the height level of the pre-sealing unit P (that is, if the working-tank sealing mechanism is completely drained), as shown in FIG. 9, the water level in the pre-sealing unit P inevitably lowers. Thus, the working tank 1 cannot be kept filled with the clean working fluid.

Thereupon, the working fluid can be equally supplied to the upper part of the sealing mechanism by using the pre-sealing bellows cover 3 with the openings 22 shown in FIG. 7 in the pre-sealing unit. Accordingly, the clean working fluid can be reliably introduced to the sealing mechanism without being affected by the working fluid level 15 in the working tank 1, so that contaminants can be discharged from the pre-sealing unit. Thus, the durability and maintenance cycle of each part of the sealing mechanism can be considerably improved.

The invention claimed is:

1. A pre-sealing unit for a wire-cut electric discharge machine, the pre-sealing unit configured to be attached to a sealing mechanism in a lower-arm insertion portion of a working tank mounted on a movable table, the pre-sealing unit comprising:
   a partition unit configured to surround the sealing mechanism from within the working tank;
   a working-fluid supply unit configured to introduce a clean working fluid into a space defined by the sealing mechanism and the partition unit, under a pressure higher than the pressure of the working fluid present outside the space;
   a bellows unit having an operating range corresponding to the range of movement of the movable table in the direction perpendicular to the axis of a lower arm; and
   a movable-window closing member through which the lower arm is inserted,
   wherein a window portion is formed on the partition unit at a portion facing the inside of the working tank, and the bellows unit and the movable-window closing member are arranged at the window portion so that the greater part of the window portion is closed thereby, and
   wherein a supply pipe, the longitudinal direction of which is perpendicular to the axis of the lower arm and which has a plurality of openings on the sealing mechanism side thereof, is located at the upper part of the bellows unit, whereby the clean working fluid is allowed to be introduced into the pre-sealing unit through the openings of the supply pipe.

2. The pre-sealing unit for a wire-cut electric discharge machine according to claim 1, wherein the sum total of the respective cross-sectional areas of the openings of the supply pipe is smaller than the cross-sectional area of a supply port leading to the supply pipe.

3. The pre-sealing unit for a wire-cut electric discharge machine according to claim 1, wherein the bellows unit is supported by a cover to which the supply pipe is attached.

* * * * *